(12) United States Patent
Schaefer

(10) Patent No.: US 8,551,215 B2
(45) Date of Patent: Oct. 8, 2013

(54) SYSTEM AND METHOD OF OPERATION FOR CONTROLLED ATMOSPHERE STORAGE

(76) Inventor: James C. Schaefer, Rockford, MI (US)

( * ) Notice: Subject to any disclaimer, the term of this patent is extended or adjusted under 35 U.S.C. 154(b) by 226 days.

(21) Appl. No.: 13/168,315

(22) Filed: Jun. 24, 2011

(65) Prior Publication Data

US 2012/0325086 A1 Dec. 27, 2012

(51) Int. Cl.
*B01D 53/14* (2006.01)

(52) U.S. Cl.
USPC ........ 95/26; 95/139; 95/159; 95/171; 96/234; 426/418; 426/419

(58) Field of Classification Search
USPC ....... 95/26, 139, 159, 171; 96/234; 426/418, 426/419
See application file for complete search history.

(56) References Cited

U.S. PATENT DOCUMENTS

| | | | | |
|---|---|---|---|---|
| 3,453,085 A * | 7/1969 | Townsend et al. | | 422/116 |
| 3,594,986 A * | 7/1971 | Schmid | | 95/139 |
| 3,981,698 A * | 9/1976 | Leppard | | 95/119 |
| 4,142,372 A * | 3/1979 | Kato et al. | | 62/78 |
| 4,203,958 A * | 5/1980 | Snarski | | 423/351 |
| 4,716,739 A * | 1/1988 | Harris et al. | | 62/78 |
| 4,740,378 A * | 4/1988 | Jameson | | 426/419 |
| 5,249,428 A * | 10/1993 | Barbe et al. | | 62/78 |
| 5,623,105 A * | 4/1997 | Liston et al. | | 73/863.81 |
| 5,649,995 A * | 7/1997 | Gast, Jr. | | 95/12 |
| 6,113,671 A * | 9/2000 | Garrett | | 95/98 |
| 6,197,269 B1 * | 3/2001 | Jansen et al. | | 423/243.01 |
| 6,344,070 B1 * | 2/2002 | Banks | | 95/98 |
| 6,615,908 B1 * | 9/2003 | Bosher et al. | | 165/48.1 |
| 7,947,318 B2 * | 5/2011 | Tracy | | 426/231 |
| 8,177,883 B2 * | 5/2012 | Jorgensen et al. | | 95/12 |
| 2011/0277629 A1 * | 11/2011 | Manning et al. | | 95/15 |

* cited by examiner

*Primary Examiner* — Christopher P Jones
(74) *Attorney, Agent, or Firm* — Warner Norcross & Judd LLP

(57) ABSTRACT

A nitrogen-flush scrubber system for a controlled atmosphere room in which the amount of nitrogen required to flush the regenerated scrubber beds is significantly reduced. The present invention provides a dual-bed scrubber system in which low oxygen air salvaged from the active scrubber bed is used to flush high oxygen air from the regenerated scrubber bed prior to nitrogen flush. The scrubber system may include two scrubber beds that are used alternately to scrub air from the CA room. One scrubber bed is used as an active scrubber bed to remove carbon dioxide from the air. The inactive scrubber bed may be regenerated while it is inactive. When the active scrubber bed becomes sufficiently saturated, the control system may switch the active scrubber bed, using the regenerated bed as the active scrubber bed and allowing the saturated bed to be regenerated.

18 Claims, 3 Drawing Sheets

SYSTEM AND METHOD OF OPERATION FOR CONTROLLED ATMOSPHERE STORAGE

BACKGROUND OF THE INVENTION

The present invention relates to controlled atmosphere storage, and more particularly to a system and method for improved scrubbing in controlled atmosphere storage.

Perishable items, such as post-harvest fruits and vegetables, are often stored in a gastight storage facilities. The atmosphere in even a gastight storage space will vary over time as a result of various factors. One of the more important factors affecting atmosphere is fruit respiration. Fruit respiration can have a significant affect on the oxygen and carbon dioxide levels in a storage room. Fruit respiration is the natural ripening process that occurs in fruits and vegetable after harvest. Respiration is the uptake of oxygen and the discharge of carbon dioxide just like the human body would do while breathing. The post-harvest life of fruits and vegetable life can be prolonged for an extended marketing period when placed in gastight refrigerated storage rooms. Normal respiration would reduce the oxygen in the space and also elevate the carbon dioxide.

To provide improved storage, post-harvest commodities are often stored in controlled atmosphere rooms ("CA rooms") where factors, such as temperature and atmospheric composition, can be controlled to extend the life of the items. CA rooms typically include systems for monitoring and controlling temperature and atmospheric conditions (e.g. oxygen, carbon dioxide and nitrogen levels) in a gastight space. The atmospheric control systems often operate by repeatedly sampling gas levels within the CA room and adding or removing gases to maintain the atmosphere at one or more desired setpoints.

Because normal fruit respiration results in a reduction in oxygen and an increase in carbon dioxide, many CA rooms include carbon dioxide scrubber systems capable of removing carbon dioxide from the atmosphere of the CA room. A variety of different types of scrubber systems are currently in use and available from a number of well-known suppliers, such as Storage Control Systems, Inc. of Sparta, Mich. A typically carbon dioxide scrubber includes a scrubbing media that removes carbon dioxide from gas. For example, many conventional scrubbers use one or more beds of activated carbon as the scrubbing media. The activated carbon adsorbs carbon dioxide from CA room air that is blown through beds of activated carbon. The adsorption process slowly saturates the activated carbon with carbon dioxide. Once the activated carbon becomes sufficiently saturated, the activated carbon bed is regenerated by flushing the bed with low carbon dioxide air, such as ambient air.

Because the regeneration process takes time, scrubber systems have been developed that include two alternative scrubbing beds, such as two activated carbon beds. While one bed is used for scrubbing, the other bed can be regenerated. As a result, the overall system is capable of providing essentially continuous scrubbing.

Generally, ambient air is used to regenerate the activated carbon beds. Although ambient air is low in carbon dioxide, it is high in oxygen content relative to the CA room air. Accordingly, once a bed of this type is regenerated, it will typically contain high oxygen air. In typical systems of this type, air within the CA room is circulated through the scrubber and returned to the CA room in a closed loop. As a result, if no accommodation is made, the high oxygen air of the regenerated bed will be introduced into the CA room. The high oxygen air can raise the oxygen level in the CA room atmosphere to an undesirable level where it adversely impacts the function of the CA room.

To address this problem, some systems have been developed to flush the high oxygen air from the regenerated activated carbon scrubber beds with nitrogen before the regenerated activated carbon bed is used to scrub CA room air. In these systems, ambient air is used to regenerate the activated carbon bed. Once the bed is sufficiently regenerated, nitrogen is introduced into the bed to reduce the oxygen content. Typically, a predetermined amount of nitrogen will be introduced into each bed following regeneration and prior to its next scrubbing cycle. Although a nitrogen flush system helps to resolve the concerns associated with high oxygen air, there is a significant cost associated with the generation of nitrogen used to flush the regenerated scrubber beds.

As an alternative to nitrogen flush systems, some systems have been developed to use the low oxygen air present in an activated carbon scrubber bed to help address the problem of high oxygen air in regenerated scrubber beds. For example, some existing systems extract low oxygen air from an activated carbon scrubber bed before introducing ambient air into the bed for regeneration. The air is typically extracted by closing off the circulation loop and pumping air from the scrubber bed back into the room, which temporarily pressurizes the CA room. The extracted air is introduced into a regenerated bed to drive off some of the higher oxygen air, thereby returning the pressure in the CA room back to normal and reducing the overall oxygen content of the air in the regenerated bed. Although the return of extracted low oxygen air helps to reduce the oxygen in the regenerated bed, it is typically not sufficient to lower the oxygen content to the desired level.

SUMMARY OF THE INVENTION

The present invention provides a controlled atmosphere room scrubber system with an improved system and method for purging (or flushing) regenerated scrubber beds. The present invention includes a system in which low oxygen air present in a scrubber bed is saved and used to flush high oxygen air from a regenerated scrubber bed after which a nitrogen flush is used to further reduce the oxygen content in the scrubber bed to the desired level. The salvaged low oxygen air reduces the oxygen content in the regenerated bed, thereby reducing the amount of nitrogen needed to bring the oxygen content in the regenerated bed to the desired level.

In one embodiment, the scrubber system includes two scrubber beds that are used alternately to scrub air from the CA room. In this embodiment, one scrubber bed is used at a time to remove carbon dioxide from the air (the "active" bed). While one bed is active, the other bed may be regenerated using generally conventional regeneration methods. Generally speaking, the regeneration process regenerates the adsorbent in the scrubber bed by moving fresh air over the adsorbent. When the regeneration process is complete, the regenerated bed contains high oxygen air that has the potential to adversely affect commodities contained in the CA room. When the active bed becomes sufficiently saturated, the system will switch which scrubber bed is active. When it is desirable to alternate the scrubber beds, a volume of low oxygen air is removed from the then-active scrubber bed (i.e. the saturated bed that is currently active, but will be switching to inactive status for regeneration). The low oxygen air in the scrubber bed to be regenerated may be salvaged by moved it back into the pipework and the CA room or it may be moved into a dedicated storage reservoir, such as an air bag. The salvaged low oxygen air may then be moved into the other scrubber bed (i.e. the regenerated bed that is currently idle and that contains high oxygen content air), where it reduces the oxygen content in the regenerated bed. After the salvaged low oxygen air is moved into the regenerated bed, nitrogen purge may be used to further reduce the oxygen content in regenerated scrubber bed to the desired level. Once the regenerated scrubber bed reaches the desired oxygen level, it can become the "active" bed and may be used to scrub air from the CA room.

In one embodiment, the system introduces fresh air into the scrubber bed to force low oxygen air back into the pipework used to move air from the CA room into the scrubber bed for scrubbing. Depending on the system, this low oxygen air may flow back into the CA room. In another embodiment, the pipework may include an air bag or other reservoir for temporarily storing the salvaged air before it is moved to the regenerated scrubber bed. In some applications, the low oxygen air may be moved directly from the saturated bed to the regenerated bed.

In one embodiment, the system includes a regeneration blower for moving fresh air into a scrubber bed to force the low oxygen content air back into the pipework and any other storage reservoir.

In one embodiment, the system includes a single source of nitrogen that can be used to used introduce nitrogen into the CA room and/or to flush high oxygen air from a regenerated scrubber bed. The nitrogen source may include a diverter valve to ensure that the nitrogen source is supplying nitrogen to a scrubber bed or a CA room (and not both). This helps to ensure that there is sufficient pressure to provide an adequate supply of nitrogen to either the scrubber bed or the CA room.

In this way, the present invention uses salvaged low oxygen air and nitrogen purge in concert to provide oxygen reduction not achievable with conventional systems that operate from salvaged air and at a greater efficiency than might be obtained from conventional systems that operate using nitrogen purge. These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

I. Overview

Figure 1:
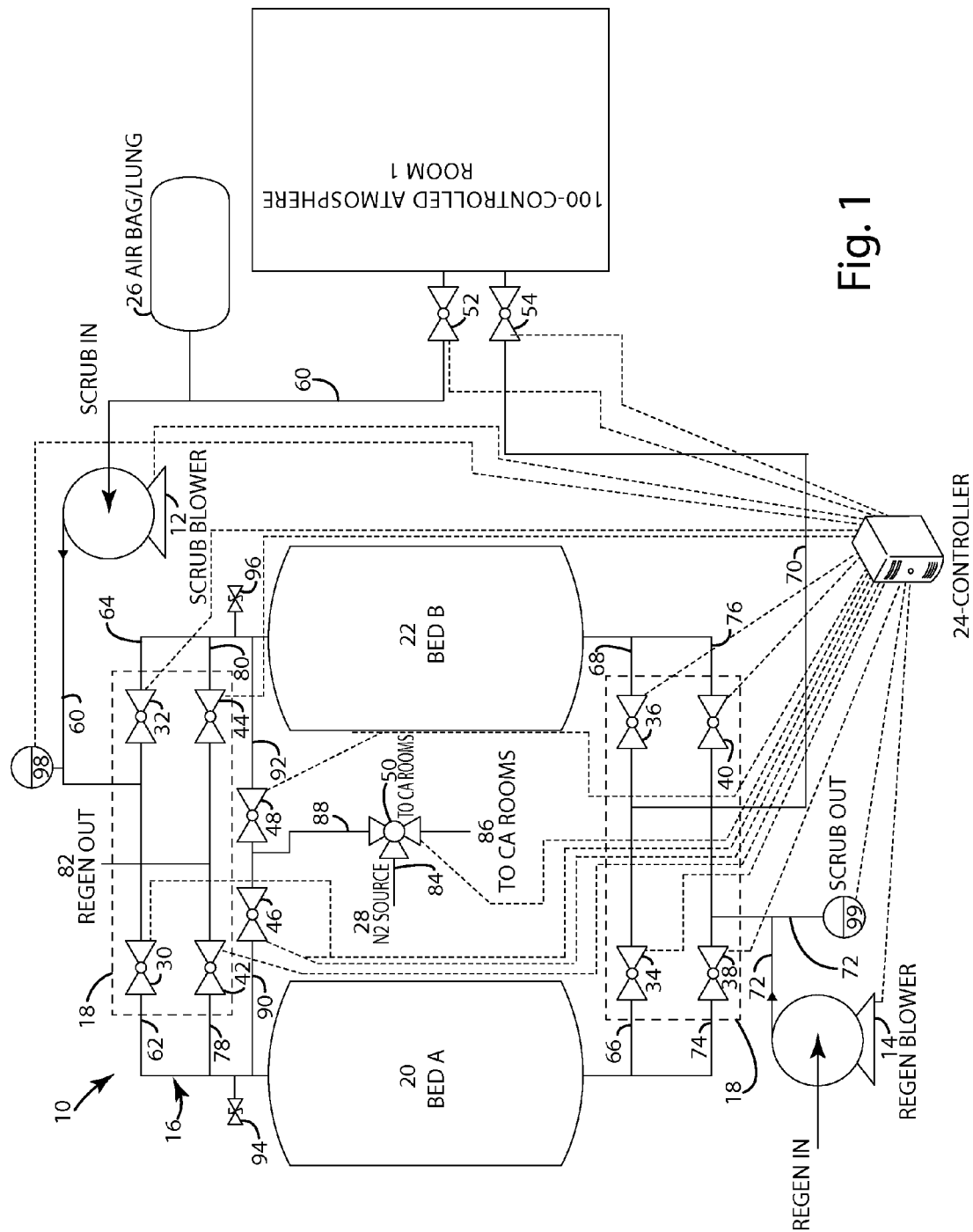
FIG. 1 is a schematic representation of a scrubber system in accordance with an embodiment of the present invention.

A scrubber system in accordance with an embodiment of the present invention in shown in FIG. 1. The scrubber system 10 of this embodiment is intended for use in reducing the carbon dioxide level in air from a controlled atmosphere room (CA room), such as the type use for storage of fruits and vegetables. The scrubber system 10 generally include a scrubber blower 12, a regeneration blower 14, a pipework 16, valve arrangement 18, and a pair of parallel scrubber beds 20 and 22. The system 10 also includes a controller 24 that controls operation of the blowers 12 and 14 and valve arrangement 18. In use, the controller 24 operates the scrubber system to move CA room air through one of the two scrubber beds 20 or 22 when it is desirable to reduce the carbon dioxide level in the CA room air. The controller 24 periodically alternates between which scrubber bed 20 and 22 is active, and performs regeneration of the non-active bed (i.e. the bed not being used to scrub CA room air). To perform regeneration, the controller engages the regeneration blower 14 to move fresh air (e.g. ambient air) through the scrubber bed 20 or 22. Fresh air is moved through the scrubber bed 20 or 22 until it is sufficiently regenerated. When it is time to switch between active scrubber beds 20 and 22, the controller 24 is configured to use salvaged low oxygen air and nitrogen to purge the regenerated bed 20 or 22. More specifically, the controller 24 is programmed to temporarily stop scrubbing and implement the process of: (a) adjusting the valve arrangement 18 and operating a blower 12 or 14 to move low oxygen air from the active scrubber bed 20 or 22 (i.e. the scrubber bed that is currently active, but will shortly be switched to inactive status) into the pipework 16 and the CA room, (b) adjusting the valve arrangement 18 and operating a blower 12, 14 to move low oxygen air from the pipework 16 and CA room into the regenerated bed 20 or 22 (i.e. the scrubber bed that is currently inactive, but will shortly be switched to active status, and (c) adjusting the valve arrangement 18 and introducing nitrogen into the regenerated scrubber bed 20 or 22 to further reduce the oxygen level to the desired value. In operation, moving salvaged low oxygen air into the regenerated bed 20 or 22 reduces the oxygen content of the air in the scrubber bed 20 or 22, thereby reducing the amount of nitrogen needed to bring the air in the scrubber bed 20 or 22 to the desired oxygen level. Once the oxygen content of the regenerated scrubber bed 20 or 22 is reduced to the desired level, the system may make it the "active" scrubber bed and may begin to move CA room air through it for scrubbing purposes, for example, by adjusting the valve arrangement and operating the scrubber blower 12. Further, to regenerate the newly activated scrubber bed 20 or 22, the system may adjust the valve arrangement 18 and operate the regeneration blower 14 to move fresh air into the newly inactivated scrubber bed 20 or 22. Typically, the regeneration process will end when regeneration is complete and the inactive scrubber bed will remain idle until the active scrubber bed is sufficiently saturated and it is time to again alternate active scrubber bed. At the time, the above described process may be repeated.

The present invention is described in connection with a control system 10 that is integrated into a CA room. The present invention is well-suited for use in essentially any gastight (or substantially gastight) space, and the term "CA room" is intended to broadly encompass any gastight (or substantially gastight) space used in the storage of perishable commodities, such as fruits and vegetables.

II. System

A scrubber system 10 in accordance with an embodiment of the present invention will now be described in more detail with reference to FIG. 1. As noted above, the scrubber system 10 generally include a scrubber blower 12, a regeneration blower 14, a pipework 16, valve arrangement 18, a pair of parallel scrubber beds 20 and 22 and a controller 24 that controls operation of the system 10. The scrubber system 10 is described in connection with a generally conventional CA room 100. The CA room 100 is essentially a closed space of sufficient size to receive and store the desired volume of perishable commodities, such as fruits or vegetables. The CA room 100 may include a control system that provides set point control over various CA room characteristics, such as temperature and atmospheric composition. The setpoints may be predetermined using knowledge gained from previous experience with the stored commodities. For example, a set of oxygen setpoints may be developed for a specific fruit to allow the system to adjust the oxygen levels in the atmosphere to follow a predetermined profile over time. Alternatively, the CA room may include a control system that provides a dynamic controlled atmosphere ("DCA"). In this embodiment, the control system may provides a mechanism for dynamically monitoring and controlling the atmosphere in the CA room based not on predetermined setpoints, but rather on information derived on the fly through monitoring the response of the commodities to environmental changes. For example, the DCA control system may be configured to systematically change the absolute minimum level of oxygen in a gastight space available for the fruit in an effort to maintain just enough oxygen in the atmosphere for the commodities to stay alive. A reiterative process is beneficial because the minimum acceptable level will be ever changing over time depending on variety, age, temperature, etc. By dynamically maintaining minimal oxygen, the best postharvest life cycle of the stored commodity can be obtained. The present invention may include an enclosure that can be placed within the CA room to store a representative sample of the commodities where they can be tested to determine appropriate DCA adjustments. For example, the CA room 100 may incorporate the dynamic control system disclosed in U.S. application Ser. No. 12/911,799, entitled DYNAMIC CONTROL SYSTEM AND METHOD FOR CONTROLLED ATMOSPHERE ROOM, which was filed on Oct. 26, 2010, by James C. Schaefer et al, and which is incorporated herein in its entirety.

Figure 3:
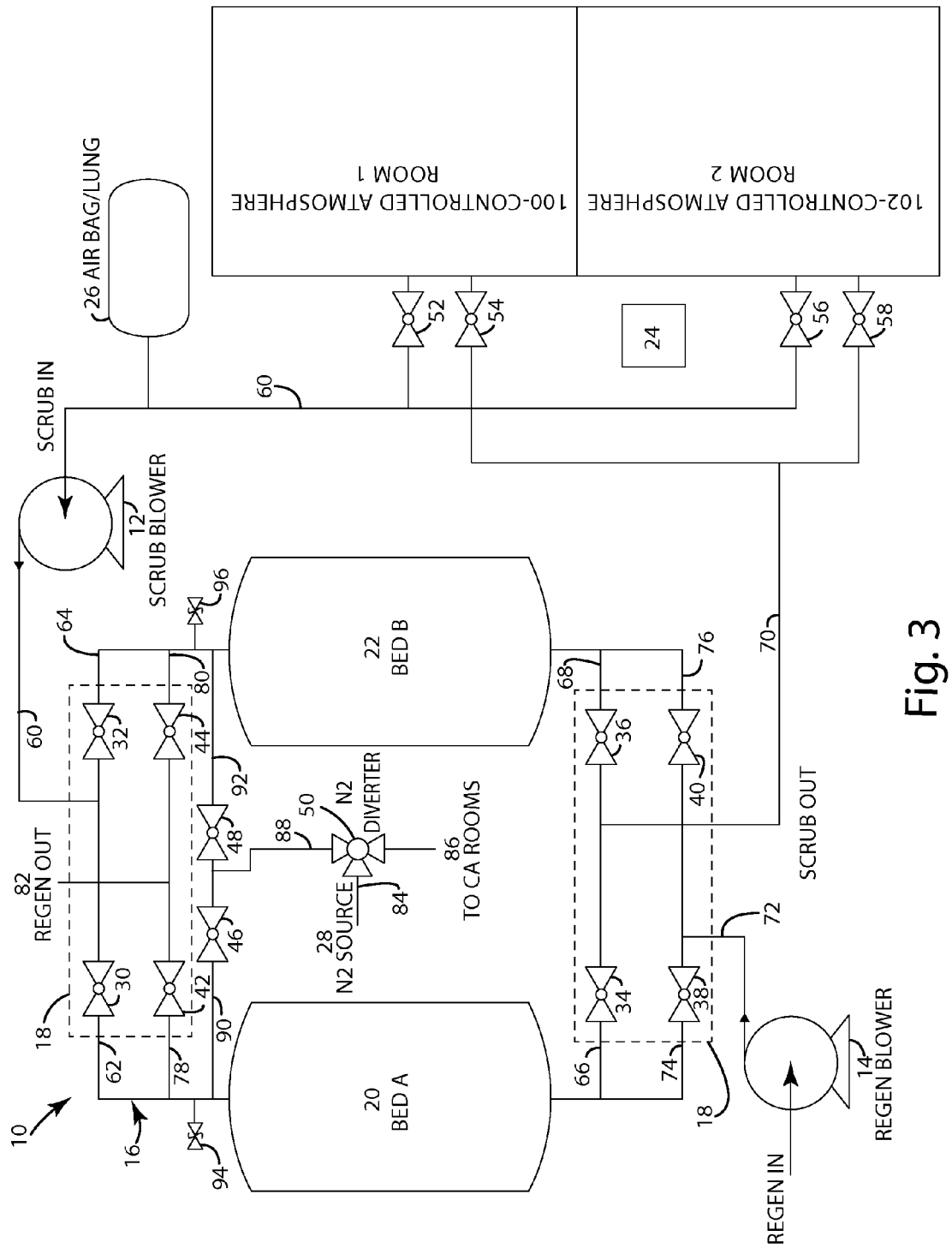
FIG. 3 is a schematic representation of a scrubber system in accordance with an embodiment of the present invention.

Regardless of the CA room control system, the scrubber system 10 of the present invention may be incorporated directly into the CA room 100 or it may be a separate system that is operatively coupled to the CA room 100 (as shown in FIG. 1). For example, the scrubbing system 10 may be a stand alone system that is coupled to the CA room 100 by a closed loop supply and return line. The scrubber system 10 may share a controller with the CA room 100, if desired. This may reduce cost and make it simpler to coordinate the activities of the CA room 100 with those of the scrubber system 10. It should also be noted that a single scrubber system 10 may be coupled to more than one CA room 100 and 102, as shown in FIG. 3.

The scrubber blower 12 operates to move air from the CA room 100 to the scrubber system 10. In some applications, it may also be used to occasionally move air in the opposite direction from a scrubber bed 20 or 22 to the pipework 16, air bag 26 and/or CA room 100. The scrubber blower 12 may be essentially any blower, fan or other mechanism capable of moving air. The type and capacity of the scrubber blower 12 may vary from application to application as desired. In the illustrated embodiment, the scrubber blower 12 is a one-way blower, but it may alternatively by a two-way blower capable of alternately being operated in opposite directions (i.e. moving air from the CA room 100 to the scrubber system 10 or from the scrubber system 10 to the CA room 100).

The regeneration blower 14 operates to move air into the scrubber beds 20 and 22 during the regeneration stage and when salvaging low oxygen air from a scrubber bed 20 or 22. For example, the regeneration blower 14 may be configured to move fresh air (e.g. ambient air) over the scrubber beds 20 and 22 to allow the fresh air to regenerate the scrubber beds 20 and 22. In some applications, the regeneration blower 14 may also be used to move salvaged low oxygen air back into a scrubber bed 20 and 22. For example, the regeneration blower 14 may in some applications be operated in reverse to draw air into a scrubber bed 20 and 22 from the pipework 16, air bag 26 and/or CA room 100. The regeneration blower 14 may be essentially any blower, fan or other mechanism capable of moving air. The type and capacity of the regeneration blower 14 may vary from application to application as desired. In the illustrated embodiment, the regeneration blower 14 is a one-way blower, but it may alternately be a two-way blower capable of being operated in opposite directions (i.e. moving air fresh air into a scrubber bed 20 or 22 or drawing air from the pipework 16 back into a scrubber bed 20 or 22).

The scrubber system 10 includes a pipework 16 and valve arrangement 18 that provides reconfigurable air flow pathways for implementing the present invention. Although the precise pipework and valve arrangement may vary from application to application, the pipework 16 of the illustrated embodiment can generally be broken down generally into three functional groupings—a first grouping that primarily (but not exclusively) functions to circulate CA room air during scrubbing, a second grouping that primarily functions to transport air during regeneration and purging and a third group that controls the movement of nitrogen through the system.

The first grouping generally includes CA room supply line 60 that provides an air flow line between the CA room 100 and valves 30 and 32, bed A supply line 62 between valve 30 and scrubber bed 20, bed B supply line 64 that couples valve 32 with scrubber bed 22, bed A return line 66 between scrubber bed 20 and valve 34, bed B return line 68 between scrubber bed 22 and valve 36 and CA room return line 70. In this embodiment, the scrubber blower 12 is disposed along the supply line 60.

The first grouping of this embodiment also includes separate valves 52 and 54 on the inlet and outlet of the CA room 100. In the embodiment of FIG. 3, the third grouping includes valves 52, 54, 56 and 58 on the inlet and outlet of both CA rooms 100 and 102. In applications with additional CA rooms, the system 10 may include separate valves for each CA room.

The second grouping generally includes regeneration supply line 72 that provide an air flow line between a fresh air inlet and valves 38 and 40, bed A regen supply line 74 between valve 38 and scrubber bed 20, bed B regen supply line 76 that couples valve 40 with scrubber bed 22, bed A regen exhaust line 78 between scrubber bed 20 and valve 42, bed B regen exhaust line 80 between scrubber bed 22 and valve 44 and regeneration out line 82 that vents valves 42 and 44 to the exterior. The regeneration out line 82 vents to an outdoor, non-confined space. In this embodiment, the regeneration blower 14 is disposed along regeneration supply line 72.

The third grouping of this embodiment includes the supply lines and valves associated with the nitrogen source 28. In this embodiment, the third grouping generally includes nitrogen source line 84, nitrogen diverter valve 50, nitrogen room supply line 86, nitrogen purge main line 88, bed A purge line 90 and bed B purge line 92. Separate nitrogen valves 46 and 48 are located in bed A purge line 90 and bed B purge line 92, respectively. Although not shown, nitrogen room supply line 86 is connected to CA room 100 to allow nitrogen to be supplied to the CA room 100 when desired.

The various lines of the pipework 16 may be conventional PVC supply lines or essentially any other type of supply line. The size of the supply lines may vary from application to application depending in part on the volume of air to be moved and the distance the air will be moved. However, in the illustrated embodiment, the supply lines may range between 3" to 8" in diameter.

The valve arrangement 18 may include any of a wide variety of valve types and sizes that will vary depending on the characteristics of the specific application. In the illustrated embodiment, all eight valves 30, 32, 34, 36, 38, 40, 42 and 44 are conventional electrically actuated motorized ball valves. Alternatively, they may be solenoid-actuated slide valves or electrically actuated slide valves, butterfly valves or other types of valves. Actuation of the valves may be automated or manual. In the illustrated embodiment, the valves are electrically actuated in a conventional manner using an electric actuator. The valve may include other types of actuators. As an alternative to electrical actuation, the valve may be actuated pneumatically.

The scrubber system 10 includes two scrubber beds 20 and 22 that can be alternately used to scrub carbon dioxide from the CA room air supplied to the system 10. The use of two scrubber beds 20 and 22 allow one bed 20 or 22 to be used for carbon dioxide removal while the other bed 20 or 22 is being regenerated. In the illustrated embodiment, the two scrubber beds 20 and 22 are generally conventional activated carbon beds. The scrubber beds 20 and 22 may, however, be essentially any regenerable scrubber beds capable of removing carbon dioxide from CA room air. For example, the activated carbon beds may alternatively be replaced by beds that include a metal-oxide based sorbent or a monoethanolamine sorbent. The activated carbon scrubber beds 20 and 22 of the present invention may be regenerated using fresh air (e.g. ambient air from the environment outside the CA room.). In some applications, regeneration of the scrubber beds may be achieved through other means (e.g. supply of heat or pressure and vacuum swings to the sorbent) and the present invention is not limited to applications that involve fresh air regeneration.

If desired, each scrubber bed 20 and 22 may include a mechanical pressure relief air safety valve 94 and 96 to reduce the risk of over pressurization of the sorbent vessel, for example, in the event of exit valve failure. Additionally if desired, analog or digital pressure sensing devices may be used in addition to valve 94 and 96 for over- and under-pressurization of scrubber bed 20 and 22.

The system 10 may further include an air bag 26, lung or other dedicated reservoir to store the low oxygen air salvaged from the active scrubber bed 20 or 22. A variety of suitable reservoirs are well-known and readily available in the market. The size and configuration of the reservoir may vary from application to application. For example, the reservoir may be selected to have sufficient volume to contain essentially all of the salvaged low oxygen air or it may be just large enough to prevent the pressure increase caused by the backfeeding of low oxygen air from exceeding some threshold or other limit.

The system 10 may also include a source of nitrogen. In the illustrated embodiment, the nitrogen source is a nitrogen generator 28. Although the illustrated embodiment includes a nitrogen generator, the nitrogen source may vary from application to application. For example, the system 10 may use a compressed cylinder of nitrogen gas, a supply of liquid nitrogen, or an on-site machine dedicated to the production of nitrogen as a source through various means (e.g. membrane separator, vacuum pressure swing adsorption, or pressure swing adsorption). Digital or analog pressure sensors maybe fitted to the nitrogen source to identify failure or status of external equipment.

In the illustrated embodiment, the control system of the scrubber system 10 is configured to integrate with the control system of the CA room 12. More specifically, a single controller 24 may be provided that operates the CA room functions and the scrubber system. For example, the controller 24 for the CA room 100 may be programmed to control operation of the CA room (e.g. monitor and adjust the atmosphere in the CA room 12) as well as controlling operation of the scrubber system 10 (e.g. scrubbing, regeneration and purge cycles). The controller 24 may be a GCS 610, GCS 6000 or GCS 595 controller available from Gas Control Systems, Inc., but essentially any individual controller or plurality of controllers capable of individually or collectively providing the functionality described herein may alternatively be used.

FIG. 3 shows an alternative embodiment of the present invention. This embodiment is generally identical to the embodiment of FIG. 1, except that the scrubber system 10 is operatively coupled to two CA rooms 100 and 102. In this alternative embodiment, each CA room 100 and 102 is provided with a set of valves 52, 54, 56 and 58 that can be selectively actuated to isolate the CA room 100 and 102. In this embodiment, a single controller 24 may be provided to coordinate operation of both CA rooms. Alternatively, each CA room may have a dedicated controller and the dedicated controllers may be provided with programming or other logic to handle any conflicts, such as simultaneous requests for shared resources. Controller 24 is not limited to two CA rooms. Controllers may be fitted with an infinite number of rooms.

III. Method

As noted above, the present invention provides a method for purging a scrubber bed that utilizes salvaged low oxygen air to reduce the cost associated with nitrogen purging.

The controller 24 may be configured to monitor the carbon dioxide levels in the CA room air. When appropriate, the controller 24 may engage the scrubbing process to remove carbon dioxide from the CA room air. In this illustrated embodiment, the scrubbing process is engaged by engaging the scrubber blower 12 and actuating the appropriate valves depending on whether scrubber bed 20 or scrubber bed 22 is active. If scrubber bed 20 is active, valves 30 and 34 are opened and valves 32 and 36 are closed. As a result, scrubber blower 12 moves air from CA room 100 to scrubber bed 20 through supply line 60, valve 30 and bed A supply line 62. The air moves over the sorbent in the scrubber bed 20 and returns to the CA room 100 by bed A return line 66, valve 34 and CA room return line 70. If scrubber bed 22 is active, valves 32 and 36 are opened and valves 30 and 34 are closed. As a result, scrubber blower 12 moves air from CA room 100 to scrubber bed 22 through supply line 60, valve 32 and bed B supply line 64. The air moves over the sorbent in the scrubber bed 22 and returns to the CA room 100 by bed B return line 68, valve 36 and CA room return line 70.

When it is determined that a scrubber bed 20 or 22 is sufficiently saturated, the controller 24 may switch the active scrubber bed between scrubber bed 20 and scrubber bed 22, and may cause the saturated bed (i.e. the newly inactive scrubber bed) to undergo a regeneration process. The controller 24 may determine when a scrubber bed 20 or 22 is saturated using a predetermined schedule or it may make that determination in real time by monitoring system parameters, such as carbon dioxide level. In some applications, the regeneration process may be controlled manually.

In the illustrated embodiment, regeneration is carried out by moving fresh air over the sorbent in the saturated scrubber bed 20 or 22 to remove the adsorbed carbon dioxide. In this embodiment, the controller 24 actuates the valve arrangement 18 depending on which scrubber bed 20 or 22 is to be regenerated, then engages regeneration blower 14. To regenerate scrubber bed 20, valves 38 and 42 are opened and valves 40 and 44 are closed. To regenerate scrubber bed 22, valves 40 and 44 are opened and valves 38 and 42 are closed.

As noted above, the regeneration process involves passing fresh air over the saturated sorbent. Although this regenerates the sorbent, it leaves the scrubber bed 20 or 22 full of high oxygen content air. If this high oxygen content air is passed to the CA room 100 it can undesirably raise the oxygen content in the CA room air, which can have a negative effect on commodity storage. For example, increased oxygen can lead to increased fruit respiration, which reduces the storage life of fruit. Before activating a regenerated scrubber bed 20 or 22, the system 10 may take steps to address this issue. In the illustrated embodiment, the system 10 salvages low oxygen air from the active scrubber bed 20 or 22 just before it undergoes regeneration and uses this salvaged air to flush some of the high oxygen air from the already regenerated scrubber bed 20 or 22 just before it becomes the active scrubber bed. This introduction of low oxygen air will reduce the oxygen level in the regenerated scrubber bed, but is not likely in many applications to reduce the oxygen content to the desired level. Accordingly, the system 10 is configured to perform an additional process to further reduce the oxygen content in the regenerated scrubber bed 20 or 22. In the illustrated embodiment, the additional process involves introducing nitrogen into the regenerated scrubber bed 20 or 22. However, the additional process may vary from application to application, if desired.

Figure 2:
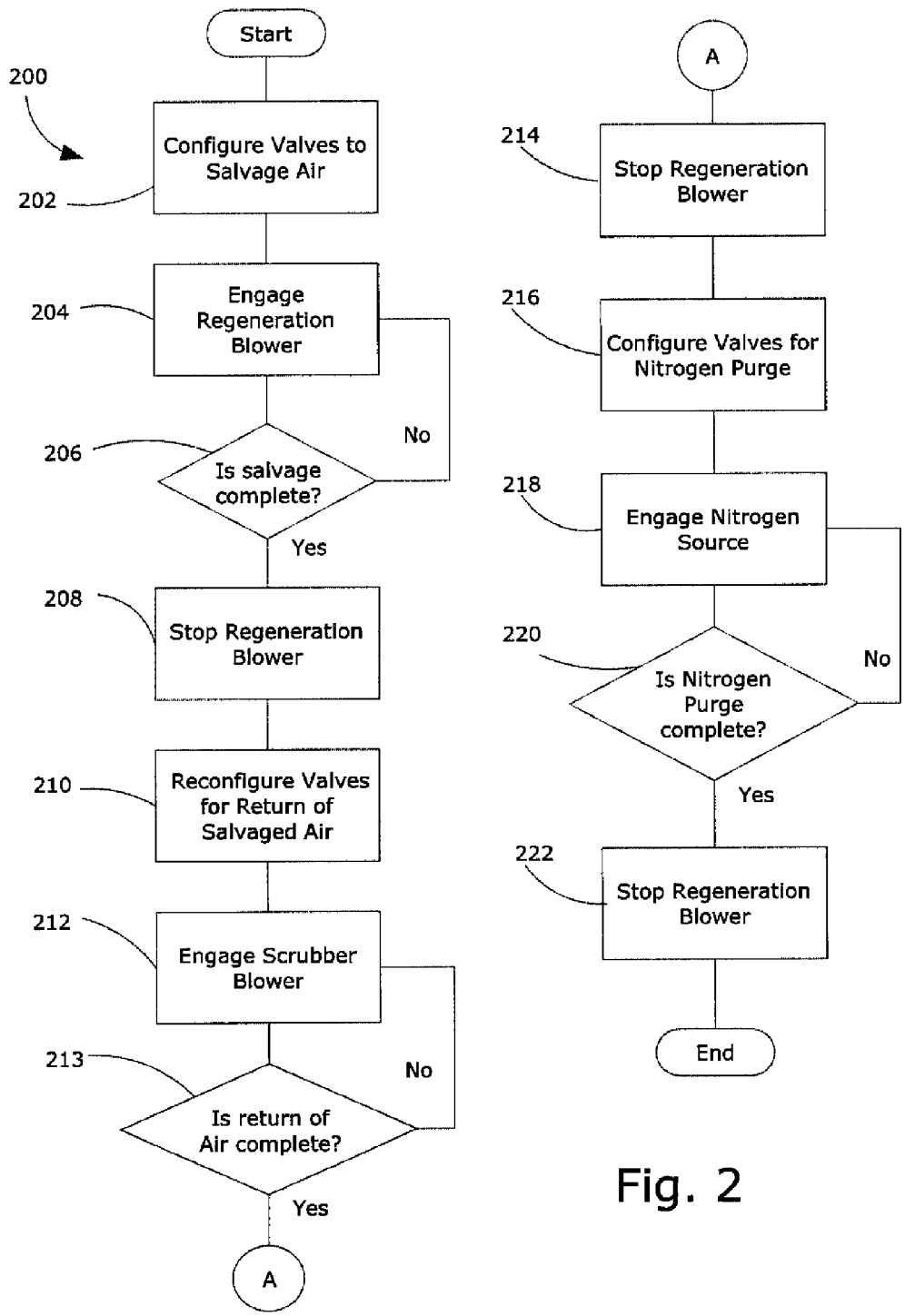
FIG. 2 is a flow chart showing the general steps of a method in accordance with an embodiment of the present invention.

The process of purging a scrubber bed 20 or 22 in one embodiment of the present invention will now be described in more detail with reference to FIG. 2. In this embodiment, the purging process can be broken down in three general steps: (1) salvaging low oxygen air from the active scrubber bed, (2) moving the salvaged air to the regenerated bed to begin to reduce its oxygen level and (3) flushing the regenerated bed with nitrogen until the desired oxygen level is reached. In this embodiment, the controller 24 is configured to operate the purging process through actuation of the valve arrangement 18, scrubber blower 12, regeneration blower 14 and nitrogen source 28. In the purging process 200 of the embodiment of FIG. 2, the controller 24 begins the salvaging step by actuating 202 the appropriate valves 18 and engaging 204 the regeneration blower 14 to move fresh air into the active scrubber bed 20 or 22 to force low oxygen air back into the pipework 16, the air bag 26 and/or the CA room 100. When scrubber bed 20 is active (and scrubber bed 22 needs to be purged), valves 30 and 38 are opened and valves 32, 34, 36, 40, 42 and 44 are closed. As a result, operation of the regeneration blower 14 forces fresh air into scrubber bed 20 forcing the low oxygen air in scrubber bed 20 to move into the pipework 16, the air bag 26 and/or the CA room 100. The controller 24 may operate the regeneration blower 14 for a sufficient amount of time to salvage the desired amount of air from the active scrubber bed. This period of time may be predetermined, for example, in the factory or during configuration of the system 10. As an alternative to time-based control, the controller 24 may monitor system parameters in real time to make the decision. For example, the controller 24 may monitor pressure in the system 10 (e.g. the scrubber bed 20, the air bag 26 and/or the CA room) to determine when to disengage the scrubber blower 12. As another example, the controller 24 may monitor the oxygen level of the air in the system in a location that will provide a reading indicative of the oxygen content in the air being moved from the scrubber bed, such as in the scrubber bed, the air bag 26 or the pipework 16 between the scrubber bed and the air bag. In one implementation of this example, the controller 24 may monitor the oxygen content of air with a sample pump and an oxygen sensor located to sample air in CA room supply line 60 near the location at which CA room supply line 60 splits into bed A supply line 62 and bed B supply line 64. A potential sample pump and oxygen sensor is shown at 98 in FIG. 1. As an alternative to using the regeneration blower 14 during this stage, the system 10 may use the scrubber blower 12 to move air from the scrubber bed 20 or 22. In this alternative embodiment, the scrubber blower 12 may be operated in reverse to extract the low oxygen air from the scrubber bed 20 or 22.

With systems that include an air bag 26 (such as the illustrated embodiments), the controller 24 may close the CA room valves 52 and 54 for all or a portion of the salvaging step. For example, the CA room valves 52 and 54 may be closed the salvaging step begins so that a volume of air moved from the active scrubber flows into the air bag 26. If the volume of air to be salvaged exceeds to the volume of the air bag 26, the controller 24 may open the CA room valves 52 and 54 (or maybe just valve 52) once the air bag 26 has been sufficiently filled, thereby allowing additional air to be moved into the CA room 100. Control of the CA room valves 52 and 54 may be predetermined, for example, based on time periods determined at the factory or during configuration of the system 10. Alternatively, control may be determined in real-time based on characteristics measured during operation. For example, the controller 24 may monitor pressure in the air bag 26 and open the CA room valves 52 and 54 (or maybe just valve 52) when the pressure reaches threshold value.

Once the controller 24 determines 206 that salvaging of the low oxygen air is complete, it stops 208 the regeneration blower 14 and configures the system 10 to move the salvaged low oxygen air to the regenerated bed 20 or 22. More specifically, the controller 24 reconfigures 210 the valve arrangement 18 so that the salvaged air contained in the pipework 16, the air bag 26 and CA room 100 can be moved 212 into the scrubber bed to be purged. When scrubber bed 20 is active and scrubber bed 22 is to be purged, valves 32 and 40 are opened and valves 30, 34, 36, 38, 42 and 44 are closed. Once the valve arrangement 18 has been reconfigured, the controller 24 engages scrubber blower 12 to move air from the pipework 16, air bag 26 and CA room 100 into scrubber bed 22. The air vents, for example, to the environment, through the inlet that feeds the regeneration blower 14. As a result, low oxygen air is introduced into scrubber bed 22, thereby reducing the oxygen level in the scrubber bed air. The amount of air moved into the scrubber bed during this process may vary from application to application. In this embodiment, the controller 24 may operate the scrubber blower 12 a sufficient amount of time to move roughly the same amount of air into the regenerated scrubber bed that was salvaged from the active scrubber bed, thereby returning the CA room 100 and pipework 16 to normal pressure. With time-based control, the timing of this stage may be predetermined in the factory or during configuration of the system 10. The controller 24 could alternatively use one or pressure sensors (not shown) to control the timing of this step. As an alternative, the system 10 may use the regeneration blower 14 instead of the scrubber blower 12 to move air into the regenerated bed 20 or 22. In this alternative embodiment, the regeneration blower 14 may be operated in reverse to draw the low oxygen air into the regenerated bed 20 or 22.

After the controller 24 determines 213 that a sufficient volume of salvaged low oxygen air has been moved into the regenerated scrubber bed, the system 10 stops 214 the scrubber blower 12 and reconfigures 216 the valve arrangement 18 so that nitrogen source 28 can be engaged 218 to introduce nitrogen into the regenerated scrubber bed 20 or 22. In the illustrated embodiment, the nitrogen source 28 is coupled to the scrubber beds 20 and 22 via supply lines 84, 88, 90 and 92. Valves 46 and 48 are arranged along the supply lines 90 and 92 to permit nitrogen to be selectively supplied to either one of the scrubber beds 20 or 22. As an alternative configuration, valves 46 and 48 may be replaced by a single 3-way valve to be used to select nitrogen feed to either scrubber bed 20 or 22. The nitrogen source 28 includes its own mechanism for moving nitrogen through the scrubber bed 20 or 22. For example, the nitrogen source may have a dedicated blower or it may be stored under pressure so that its internal pressure can be used to move the nitrogen through the scrubber bed 20 or 22. In this embodiment, the nitrogen source 28 may be a dedicated source for nitrogen purge or a shared source in the sense that it can also be used to supply nitrogen to the CA room 100 (or rooms 100 and 102 . . . ) when desired. To the end, the nitrogen source 28 may include a diverter valve 50 that is operable to allow nitrogen to be supplied to either the CA room 100 or to a scrubber bed 20 or 22. By ensuring that the nitrogen source will be supplying nitrogen to only one destination, the diverter valve 50 helps to reduce the potential risk of the nitrogen source failing to provide sufficient nitrogen. The diverter valve 50 may be eliminated when the nitrogen source 28 has sufficient capacity to simultaneously supply nitrogen to the CA room 100 and to a scrubber bed 20 or 22. The controller 24 may supply a predetermined amount of nitrogen to the scrubber bed 20 or 22 selected to provide the purged scrubber bed 20 or 22 with the desired oxygen level. For example, the controller 24 may cause the nitrogen source 28 to supply nitrogen to the scrubber bed 20 or 22 for a predetermined time. The timing may be determined at the factory or during configuration of the system 10. As another option, the controller 24 may rely on real-time data measurements within the system to determine when to stop purging with nitrogen. For example, the controller 24 may monitor the oxygen content of air leaving the scrubber bed being purged, such as with a sample pump and an oxygen sensor located in an appropriate location along the pipework (e.g. regen in line 72) to control timing of the nitrogen source. A potential sample pump and oxygen sensor is shown at 99 in FIG. 1. If desired, the same sample pump and oxygen sensor may be used to monitor the CA room supply line 60 during the oxygen salvaging step and to monitor the regen in line 72 during the nitrogen purge step. This may be implemented by providing two sample pump supply lines with control valves for dictating which air is being sampled.

Once the controller 24 determines 220 that the regenerated scrubber bed has been sufficiently purged by the introduction of nitrogen, the controller 24 may stop 222 the nitrogen source and reconfigure the value arrangement 18. The controller 24 may then make the purged scrubber bed 20 or 22 the active scrubber bed and may initiate a regeneration process on the other scrubber bed 20 or 22. At such time, the process described above can be repeated, except that the two scrubber beds 20 and 22 are reversed. The process may be repeated as desired during operation of the CA room 100.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method of operating a regenerable scrubber system, comprising the steps of:
   providing a scrubber system with a first scrubber bed and a second scrubber bed;
   moving air from a controlled atmosphere room through the first scrubber bed in a closed loop via a pipework to remove carbon dioxide from the air;
   regenerating the second scrubber bed by moving high oxygen air through the second scrubber bed;
   moving low oxygen air from the first scrubber bed into the pipework;
   following said regenerating step, moving low oxygen air from the pipework into the second scrubber bed to reduce an oxygen level in the second scrubber bed; and
   introducing a purging media into the second scrubber bed to reduce an oxygen level in the second scrubber bed.

2. The method of claim 1 wherein said regenerating step is further defined as moving ambient air into the second scrubber bed.

3. The method of claim 1 wherein said step of moving low oxygen air from the first scrubber bed into the pipework is further defined as introducing ambient air into the first scrubber bed.

4. The method of claim 3 wherein said step of moving low oxygen air from the first scrubber bed into the pipework is further defined as introducing ambient air into the first scrubber bed by operating a blower to move ambient air into the first scrubber bed while the first scrubber bed remains in fluid communication with the pipework.

5. The method of claim 4 wherein said step of moving low oxygen air from the pipework into the second scrubber bed is further defined as operating a blower to move air from the pipework into the second scrubber bed while the second scrubber bed remains in fluid communication with the pipework.

6. The method of claim 1 further comprising the steps of:
moving air from the controlled atmosphere room through the second scrubber bed in a closed loop via the pipework to remove carbon dioxide from the controlled atmosphere room air; and
regenerating the first scrubber bed by moving high oxygen air through the first scrubber bed.

7. The method of claim 6 further comprising the steps of:
moving low oxygen air from the second scrubber bed into the pipework;
following said regenerating step for the first scrubber, moving low oxygen air from the pipework into the first scrubber bed to reduce an oxygen level in the first scrubber bed; and
introducing a purging media into the first scrubber bed to reduce an oxygen level in the first scrubber bed.

8. A method for operating a scrubber system, comprising the steps of:
providing a plurality of parallel scrubber beds coupled to one or more controlled atmosphere rooms by a pipework;
setting one of the plurality of scrubber beds as an active scrubber bed;
moving air from at least one of the controlled atmosphere rooms through the active scrubber to remove carbon dioxide from the air;
regenerating an inactive scrubber bed by introducing fresh air into the inactive scrubber bed, the resulting regenerated inactive scrubber bed containing high oxygen content air;
salvaging low oxygen air from the active scrubber bed;
returning salvaged low oxygen air to the regenerated inactive scrubber bed to reduce the oxygen content in the regenerated inactive scrubber bed;
purging the regenerated inactive scrubber bed with a purging media to reduce the oxygen content in the regenerated inactive scrubber bed;
resetting the active scrubber bed as an inactive scrubber bed;
establishing the purged scrubber bed as the active scrubber bed; and
repeating said moving, regenerating, salvaging, returning, purging, resetting and establishing steps.

9. The method of claim 8 wherein said salvaging step include moving air from the active scrubber bed into the pipework.

10. The method of claim 9 wherein said return step includes moving air from the pipework into the regenerated inactive scrubber bed.

11. The method of claim 10 wherein the pipework includes a reservoir configured to accept air during said salvaging step.

12. The method of claim 8 wherein the reservoir is an airbag in fluid communication with the pipework.

13. The method of claim 8 wherein said salvaging step is further defined as operating a blower to move fresh air into the active scrubber bed such that an increase in pressure in the active scrubber bed forces low oxygen air from the active scrubber bed to move into the pipework.

14. The method of claim 13 wherein said resetting step occurs following said salvaging step such that the active scrubber bed becomes the inactive scrubber bed and undergoes regeneration following movement of fresh air into the active scrubber bed.

15. The method of claim 14 wherein at least one of said salvaging step, said returning step and said purging step occurs for a predetermined period of time.

16. The method of claim 14 wherein each of said salvaging step, said returning step and said purging step occurs for a predetermined period of time.

17. The method of claim 14 wherein at least one of said salvaging step and said returning step occurs for a predetermined period of time and said purging step occurs until an oxygen content in the regenerated inactive scrubber bed reaches a desired level.

18. The method of claim 8 wherein the purging media is nitrogen.

* * * * *